United States Patent
Macey et al.

[11] Patent Number: 5,975,612
[45] Date of Patent: Nov. 2, 1999

[54] SEAT ASSEMBLY FOR A MOTOR VEHICLE RETRACTABLE BELOW THE VEHICLE FLOOR

[75] Inventors: Stuart P. Macey; John C. Mrozowski, both of Rochester; Thomas Sacoman, Clarkston; Victor Pone, Clinton Township; Robert E. Schroeder, Harrison Township, all of Mich.

[73] Assignee: DaimlerChrysler Corporation, Auburn Hills, Mich.

[21] Appl. No.: 08/935,696

[22] Filed: Sep. 23, 1997

[51] Int. Cl.⁶ ........................................................ B60N 3/04
[52] U.S. Cl. ........................ 296/66; 296/65.05; 296/65.13
[58] Field of Search ............................. 296/65.01, 65.05, 296/65.13, 66; 297/15

[56] References Cited

U.S. PATENT DOCUMENTS

| | | | |
|---|---|---|---|
| 2,582,687 | 1/1952 | Fisher | 296/65.13 |
| 2,848,273 | 8/1958 | Diaz | 296/65.13 X |
| 3,202,453 | 8/1965 | Richards | 296/66 |
| 4,382,629 | 5/1983 | Froumajou | 296/66 X |
| 4,846,520 | 7/1989 | Acuot et al. | 296/65.13 X |
| 4,880,268 | 11/1989 | Brambilla | 296/65.05 |
| 5,195,795 | 3/1993 | Cannera et al. | 296/65.1 |
| 5,269,581 | 12/1993 | Odagaki et al. | 296/66 |
| 5,702,145 | 12/1997 | Fowler et al. | 296/65.05 X |
| 5,868,451 | 2/1999 | Uno et al. | 296/65.05 X |

*Primary Examiner*—Joseph D. Pape
*Attorney, Agent, or Firm*—James R. Yee

[57] ABSTRACT

The present invention relates to a retractable seat assembly for a motor vehicle which is fully retractable below the level of the vehicle's floor. Typically, the invention involves a bench-type seat which is located behind the driver and passenger seats of a minivan or other vehicle. In an operative position, the seat has generally upright seatback which cooperates with a lower horizontal member to provide the seating portion. In the non-operative or stored position, the entire seat assembly is positioned below the level of the vehicle's floor. In one application, the forward edge and rearward edge of the seat are interconnected to the body of the vehicle for pivotal movement about translatable and fixed axes, respectively.

13 Claims, 2 Drawing Sheets

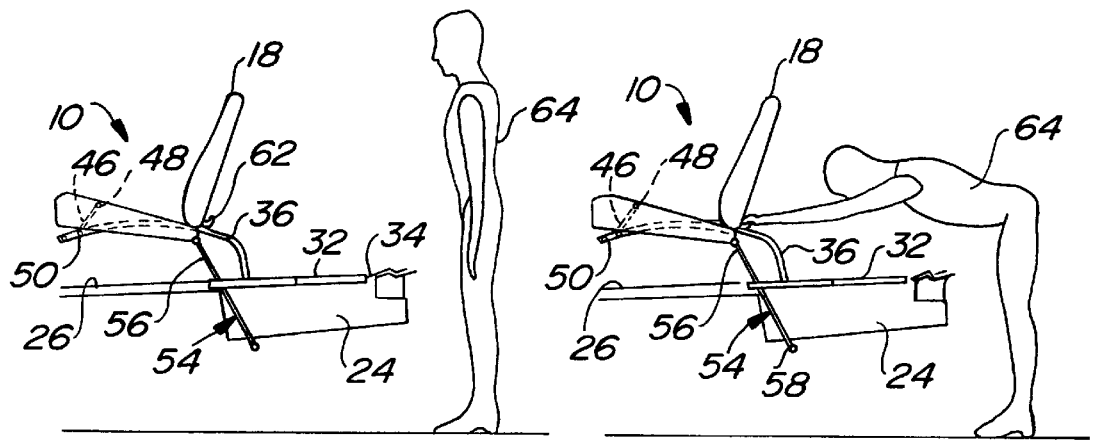
*Fig-3A* *Fig-3B*
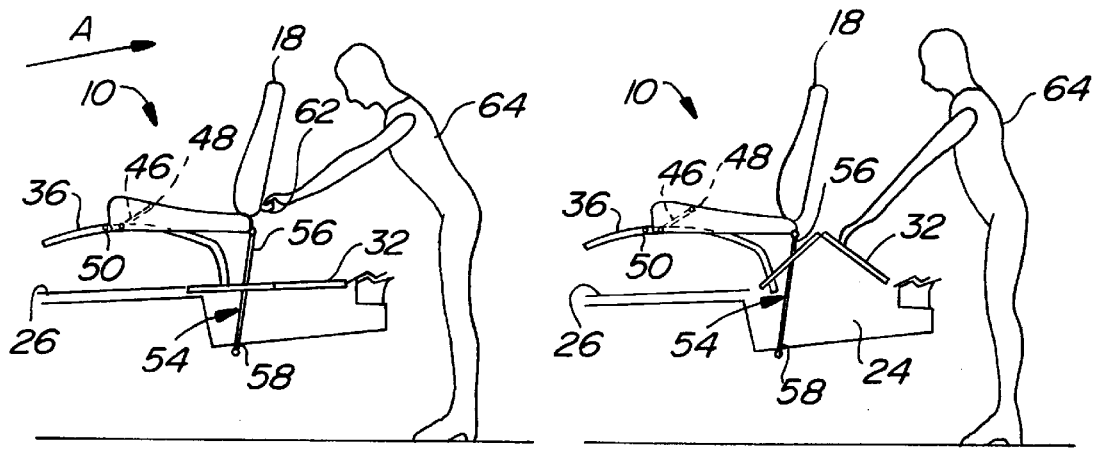
*Fig-3C* *Fig-3D*
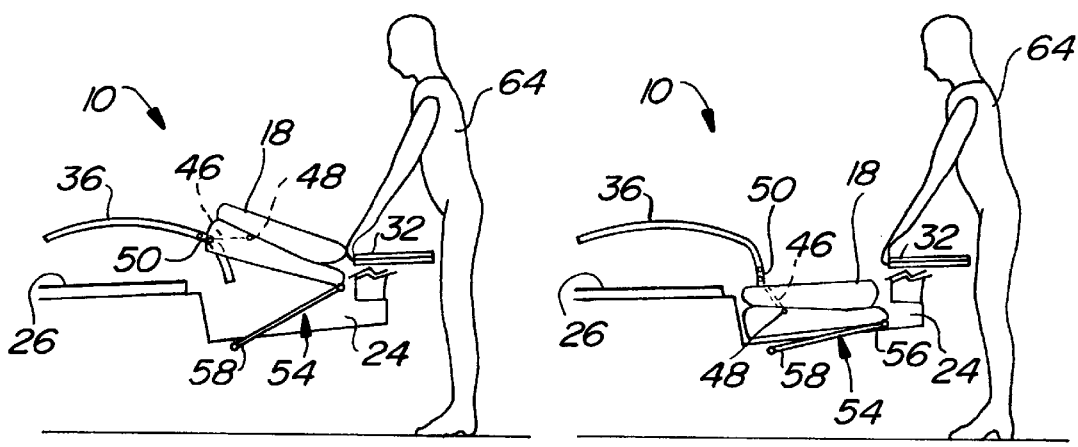
*Fig-3E* *Fig-3F*

SEAT ASSEMBLY FOR A MOTOR VEHICLE RETRACTABLE BELOW THE VEHICLE FLOOR

BACKGROUND OF THE INVENTION

1. Technical Field

The present invention generally relates to seating systems for motor vehicles and, more particularly, relates to a seat assembly for a motor vehicle which is stored below the surface of the vehicle's floor. The invention also pertains to a related method.

2. Discussion

Automotive vehicles, such as minivans, vans, station wagons, sport utility vehicles and the like, are often purchased for their carrying capacity. This carrying capacity includes both the transportation of passengers and the transportation of various sizes and amounts of cargo. For this reason, many of these vehicles are provided with one or more retractable seats which enable increased storage capacity when there is a limited number of passengers.

To satisfy the conflicting goals of maximizing passenger and cargo capacity, it is known to provide a motor vehicle with a removable seat assembly. For example, many current minivans are equipped with a rear bench seat that can be removed in order to increase cargo capacity. While such arrangements have proven to be commercially successful, they have disadvantages. For example, the weight and awkwardness of the vehicle seat often require that two persons remove the seat. Additionally, it is not always convenient to store the seat assembly once removed from the motor vehicle.

To a more limited extent, it is also known to provide motor vehicles with retractable seats. For example, retractable seat assemblies which fold into a seat storage compartment are known. One such example is shown in U.S. Pat. No. 5,195,795.

In view of known prior constructions, it is an objective of the present invention to provide a seat assembly that is retractable into a rearward storage area which does not restrict under seat storage.

SUMMARY OF THE INVENTION

In order to achieve this objection, the present invention provides a seat assembly for a motor vehicle stowable below the surface of the vehicle's floor which: (1) allows fore/aft seat adjustment to be incorporated into the travel of the stowage mechanism; (2) does not limit the storage of flat object under the seat assembly when the seat assembly is in its operative position; (3) may be moved between stowed and operative positions by a fifth percentile female; (4) effectively transfers seat belt loads to the vehicle body; and (5) allows the seat to pass through an opening which is shorter than its plan view dimension.

In one form, the present invention provides a retractable seat assembly for a motor vehicle having a body and a rearwardly located storage tub. The retractable seat assembly includes a seat having a forward edge and a rearward edge. The seat assembly additionally includes a swing arm interconnecting the forward edge of the seat and the body for pivotal movement about a movable point. Further, the retractable seat assembly includes a pivot arm interconnecting a rearward edge of the seat and body for pivotal movement about a fixed point. The forward edge pivots about the movable point and the rearward edge pivots about the fixed point as the seat is moved between an operative position and a stowed position.

In another form, the present invention provides a method of adjusting a seat for a motor vehicle having a body and rearwardly located tub between an operative position and a stowed position below a floor of the vehicle. The method includes the step of interconnecting a forward edge of the seat to the body for pivotal movement about a movable point. Additionally, the method includes the step of interconnecting a rearward edge of the seat to the body for pivotal movement about a fixed point. The seat is moved from the operative position above the floor to the stowed position substantially within the tub by simultaneously pivoting the forward edge about the movable point and the rearward edge about the fixed point.

Additional benefits and advantages of the present invention will become apparent to those skilled in the art to which this invention relates from a reading of the subsequent description of the preferred embodiment and the appended claims, taken in conjunction with the accompanying drawings.

BRIEF DESCRIPTION OF THE DRAWINGS

FIGS. 3A–3F represent a series of simplified schematic views illustrating movement of the vehicle seat of the present invention between a full forward position and a stowed position.

DETAILED DESCRIPTION OF THE PREFERRED EMBODIMENT

Figure 1:
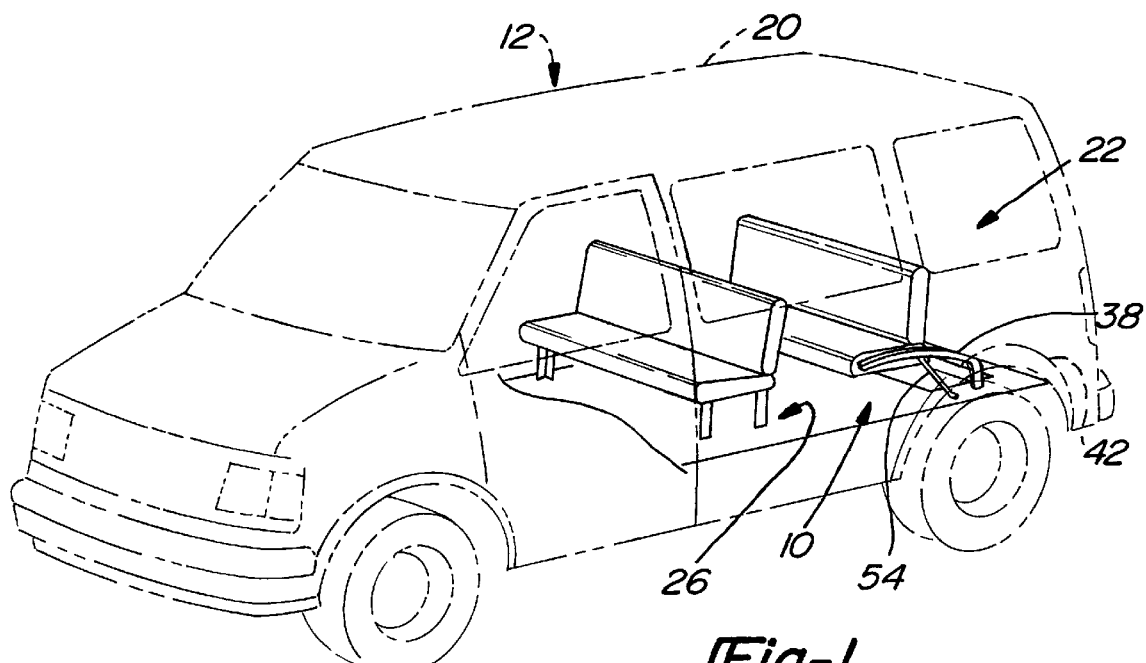
FIG. 1 is a perspective view of a vehicle seat storage system constructed in accordance with the present invention and shown mounted within a vehicle.

Referring to FIG. 1, a retractable seat assembly 10 constructed in accordance with the teachings of a preferred embodiment of the present invention is shown operatively arranged with an automotive vehicle 12 otherwise shown in phantom. The automotive vehicle 12 illustrated is a minivan and should be considered to be merely exemplary. In this regard, it will become apparent to those skilled in the art that the teachings of the present invention are equally applicable for various other types of vehicles.

Figure 2:
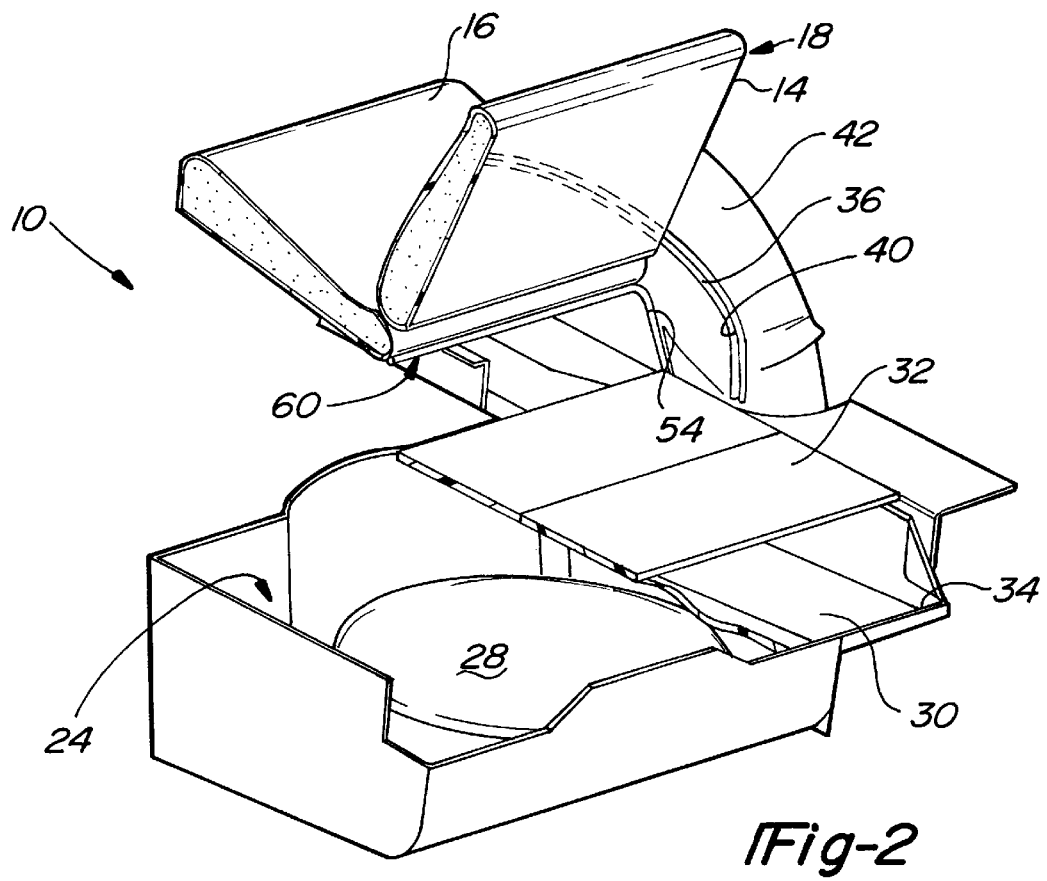
FIG. 2 is a rear perspective view of the vehicle seat storage system of the present invention, shown in partial cut-away.

With continued reference to FIG. 1 and additional reference to FIG. 2, the seat assembly 10 is shown to include a generally upright seatback member 14 and a lower horizontal member 16. In the exemplary embodiment illustrated, the generally upright seatback member 14 and horizontal member 16 cooperate to define a bench-type seat 18 positioned within the rear of the minivan 10. The seat assembly 10 is shown to include a manual operated release lever 62 which when activated permits the seatback 14 to be folded down atop the horizontal member 16 (e.g., as shown in FIG. 3F).

The vehicle 12 includes a body 20 which defines a rearward storage area 22. A storage compartment or storage tub 24 is integral with and positioned below a floor 26 of the vehicle 12 in a conventional manner. A spare tire 28 is illustrated stored within the tub 24. In the embodiment illustrated, a false bottom 30 conceals the spare tire 28. The storage compartment 24 has an overall rectangular shape which is slightly larger in area than the folded dimensions of the seat 18. It should be noted, however, that a principle advantage of the present invention is that the opening 23 of storage compartment 24 may be smaller than the tub itself and smaller than the plan view of the folded seat. This allows the seat to articulate around obstacles as it enters the tub. A door 32 is hingedly attached to the vehicle's floor 26 adjacent the trailing edge 34 of the storage compartment 24 for enclosing the tub 24.

The seating assembly 10 of the present invention is further shown to include first and second guide tracks 36 and 38 located adjacent to laterally opposed sides of the seat 18. Each of the first and second guide tracks 36 and 38, which are substantially identical in construction and function, is generally U-shaped in cross-section and partially defines a channel 40 which opens toward the interior of the vehicle 12. In the exemplary embodiment illustrated, the guide tracks 36 and 38 are welded, bolted, or otherwise suitably mounted to the wheel house structures 42 of the vehicle body. As will become more apparent below, the guide tracks 36 and 38 are configured to guide the seat 18 between an operative position and a stowed position. Because the seat 18 is supported by the first and second guide tracks 36 and 38 which are attached to the sides of the vehicle 12, the area below the seat 18 is unobstructed.

In the embodiment illustrated, the guide tracks 36 and 38 are both shown to be generally arcuate in shape for most of the length of the guide tracks 36 and 38, the curvature is generally constant, as the guide track approaches the tub 24, the curvature thereof becomes more significant such that a rear segment of the guide tracks 36 and 38 is substantially vertical.

The seat 18 is interconnected to the first and second guide tracks through a pair of legs or swing arms 46. The swing arms 46 are located on opposing lateral sides of the seat 18 and each include a first end or upper end 48 and a second end or lower end 50 (identified in FIG. 3A). The first ends 48 of the swing arms 46 are pivotally interconnected to the horizontal member 16 of the seat 18 through a pivot pin (not specifically shown). The second end 50 of each of the swing arms 46 is preferably shown as a double roller bearing assembly which is operatively received in the associated guide track 36 or 38. This interconnection of the swing arms 46 through the roller bearing assemblies 52 also allows the swing arms 46 to be pivoted about an axis defined by their second ends 50.

The seat assembly 10 further includes a pair of pivot arms 54 interconnecting the body 20 of vehicle 12 and the seat 18. Both pivot arms include an upper end 56 pivotally associated with the horizontal member 16 of the seat 18 and a lower end 58 pivotally attached to the body 20 of the vehicle 12 adjacent the bottom of the tub 24. The lower end is preferably attached through a pivot pin (not specifically shown). As shown most clearly in the cut-away view of FIG. 2, the pivot arms 54 are located adjacent laterally opposing sides of the seat 18 and are joined by an intermediate member 60 pivotally carried by the seat 18. In the preferred embodiment, the pivot arms 54 and the intermediate portion 60 are unitarily formed of metal rod stock. In the embodiment illustrated, the second ends 58 of the pivot arms 54 are positioned substantially below the rear segment of the associated guide track 36 and 38 to facilitate entry of the seat 18 within the tub 24.

The swing arms 46 effectively serve to define a translatable axis about which a forward edge of the horizontal member 16 may pivot. Similarly, the pivot arms 54 define a fixed axis about which a rear edge of the horizontal member 16 may pivot.

With specific reference to FIGS. 3A–3F operation of the seat assembly 10 of the present invention heretofore described will be detailed. FIGS. 3A–3F represent a series of simplified schematic views illustrating movement of the seat assembly 10 between its full forward position and its stowed position. A fifth percentile female 64 is shown in FIGS. 3A–3F operating the seat assembly 10.

Beginning with the seat assembly 10 in its full forward operative position (e.g. as shown in FIG. 3A), the swing arms 46 and the pivot arms 54 orient the seat 18 in an operative condition. A conventional retention mechanism (not shown) retains the seat 18 in the full forward position. Upon manual release of the retention mechanism, the seat 18 can be linearly translated to an aft position (as shown in FIG. 3C). The direction of travel is indicated by arrow A.

When it is desired to stow the seat 18 within the storage tub 24, the door 32 is folded in half about a laterally extending centerline and pivoted about a point adjacent the trailing edge 34 of the storage compartment 24. The release lever 62 is operated in a substantially conventional manner to permit the upright seatback member 14 to be folded down upon the horizontal member 16, and this step may be performed at any position of the seat as it moves along guide tracks 36 and 38. As the seat 18 continues its translation relative to guide tracks 36 and 38, the pivot arms 54 reach a substantially vertical position (as shown in FIG. 3D). Further translation of the seat 18 results in continued clockwise rotation of the pivot arms 54 about their lower ends 58 and as a result, the pivot arms 54 begin to lower the rear end of the seat 18.

Referring to specifically to FIG. 3E, the rear edge of the seat 18 first enters the tub 24 while the double bearing assembly 50 remains along the continuously curved portion of the associated guide tracks 36 and 38. In the final step of movement toward the stowed position (i.e., from FIG. 3E to FIG. 3F), the pivot arms 54 rotate to a generally horizontal position, thereby lowering the rearward edge of the seat 18 to the bottom of the tub 24. Simultaneously, the double bearing assembly 50 of the swing arms 46 encounter the rear segment of the associated guide tracks 36 and 38 causing the forward edge of the seat 18 to be downwardly deposited into the tub 24.

Finally, the door 32 can be returned to its closed position (e.g., FIG. 3C). The rearwardly spaced storage compartment 22 of the vehicle 12 has now been expanded to include the area previously occupied by the seat 18.

While the above description constitutes the preferred embodiment of the invention, it will be appreciated that the invention is susceptible to modification, variation, and change without departing from the proper scope or fair meaning of the accompanying claims. For example, while the seat 18 is shown to be manually manipulated, it will be understood that the seat 18 can alternatively be moved from its operative position to its stowed position under a source of power.

We claim:

1. A retractable seat assembly for a motor vehicle having a body, a wheel house structure, and a rearwardly located storage tub, the retractable seat assembly comprising:

a seat having a forward edge and a rearward edge;

a swing arm adapted to interconnect said forward edge of said seat to the body for pivotal movement about a movable point, wherein an upper end of said swing arm is attached adjacent to a lateral side of said seat;

a pivot arm adapted to interconnect a rearward edge of said seat to the body for pivotal movement about a fixed point;

whereby said forward edge pivots about said movable point and said rearward edge pivots about said fixed point as said seat is moved between an operative position and a stowed positions;

a guide track is adapted to be mounted to the wheel house structure and to interconnect said swing arm and the body.

2. The retractable seat assembly for a motor vehicle of claim 1, wherein said seat includes a lower horizontal member and an upper back rest member pivotally attached thereto.

3. The retractable seat assembly for a motor vehicle of claim 2, wherein a lower end of said swing arm is linearly translatable along said guide track to move said seat between a fore position and an aft position.

4. The retractable seat assembly for a motor vehicle of claim 1, wherein said pivot arm is adapted to pass through the storage tub.

5. The retractable seat assembly for a motor vehicle of claim 1, wherein said guide track opens in a substantially horizontal direction.

6. A seat storage system for a motor vehicle, having a body defining an interior floor and a rear storage area, the seat storage system comprising:

a storage tub located below the interior floor of the rear-storage area;

a retractable seat having a generally horizontal member and a generally upright seatback member pivotally attached thereto, said retractable seat being movable between an operative condition and a stored condition;

first and second guide tracks;

first and second swing arms each including first and second ends, said first end of said first and second swing arms being pivotally attached to said retractable seat, said second ends received by an associated one of said first and second guide tracks, so as to permit movement therealong and pivoting of each swing arm about its second end; and first and second pivot arms passing through said storage tub and adapted to interconnect a rear edge of said horizontal member to the body for pivotal movement about a fixed point.

7. The seat storage system for a motor vehicle of claim 6, wherein said retractable seat is translatable relative to said first and second guide tracks between a fore position and an aft position.

8. The seat storage system for a motor vehicle of claim 6, wherein each of said second ends of said swing arms include a double bearing assembly operatively received by an associated one of said first and second guide tracks.

9. The seat storage system for a motor vehicle of claim 6, wherein said first ends of said first and second swing arms are attached adjacent to laterally opposing sides of said retractable seat.

10. The seat storage system for a motor vehicle of claim 6, wherein said retractable seat is solely interconnected to the body through said first and second pair of swing arms.

11. A seat storage system for a motor vehicle having a body defining an interior floor and a rear storage area, the seat storage system comprising:

a storage tub located below the interior floor of the rear storage area;

a retractable seat having a generally horizontal member and a generally upright seatback member pivotally attached thereto, said retractable seat being movable between an operative condition and a stored condition;

first and second guide tracks each open in a generally horizontal direction;

first and second swing arms each including first and second ends, said first end of said first and second swing arms being pivotally attached to said retractable seat, said second ends received by an associated one of said first and second guide tracks, so as to permit movement therealong and pivoting of each swing arm about its second end; and first and second pivot arms adapted to interconnect a rear edge of said horizontal member to the body for pivotal movement about a fixed point.

12. A method of adjusting a seat for a motor vehicle having a body and a rearwardly located tub between an operative position and a stowed position below a floor of the vehicle, the seat including a forward edge and a rearward edge, the method including the steps of:

interconnecting the forward edge of the seat to the body for pivotal movement about a movable axis;

interconnecting the rearward edge of the seat to the body for pivotal movement about a fixed point;

moving the seat from the operative position above the floor to the stowed position substantially within the tub by simultaneously pivoting said forward edge about said movable axis and said rearward edge about said fixed axis: and, wherein the step of moving the seat assembly from an operative position above the floor to a stowed position substantially within the tub includes the step of translating the seat assembly between a fore position and an aft position.

13. A method of adjusting a seat for a motor vehicle having a body and a rearwardly located tub between an operative position and a stowed position below a floor of the vehicle, the seat including a forward edge and a rearward edge, the method including the steps of:

interconnecting the forward edge of the seat to the body for pivotal movement about a movable axis;

interconnecting the rearward edge of the seat to the body for pivotal movement about a fixed point;

moving the seat from the operative position above the floor to the stowed position substantially within the tub by simultaneously pivoting said forward edge about said movable axis and said rearward edge about said fixed axis; and, wherein the step of interconnecting a forward edge of the seat to the body for pivotal movement about a fixed axis includes the steps of mounting first and second guide tracks to the body adjacent to laterally opposing sides of said seat assembly, pivotally interconnecting a first end of each of said swing arms to the seat and pivotally attaching a second end of each of said swing arms to an associated one of said first and second guide tracks.

* * * * *